US008707260B2

(12) United States Patent
Hawkins et al.

(10) Patent No.: US 8,707,260 B2
(45) Date of Patent: Apr. 22, 2014

(54) RESOLVING INTERDEPENDENCIES BETWEEN HETEROGENEOUS ARTIFACTS IN A SOFTWARE SYSTEM

(75) Inventors: Jennifer L. Hawkins, Toronto (CA); Darshanand Khusial, Mississauga (CA); Kelly A. Lyons, Toronto (CA); Michael J. McAllister, Halifax (CA); Ross McKegney, Toronto (CA); Mark D. McKenna, Halifax (CA); Jacob Slonim, Bedford (CA)

(73) Assignee: International Business Machines Corporation, Armonk, NY (US)

( * ) Notice: Subject to any disclaimer, the term of this patent is extended or adjusted under 35 U.S.C. 154(b) by 1716 days.

(21) Appl. No.: 11/753,847

(22) Filed: May 25, 2007

(65) Prior Publication Data
US 2008/0295065 A1 Nov. 27, 2008

(51) Int. Cl.
*G06F 9/44* (2006.01)
(52) U.S. Cl.
CPC .................................. *G06F 8/70* (2013.01)
USPC .......................... 717/121; 717/120
(58) Field of Classification Search
CPC .................................................... G06F 8/70
USPC ............................ 717/100, 120–123
See application file for complete search history.

(56) References Cited

U.S. PATENT DOCUMENTS

| 5,909,570 | A  | * | 6/1999  | Webber .......................... 703/13 |
| 6,442,753 | B1 | * | 8/2002  | Gerard et al. ................. 717/170 |
| 6,442,754 | B1 | * | 8/2002  | Curtis ........................... 717/175 |
| 6,725,452 | B1 | * | 4/2004  | Te'eni et al. .................. 717/168 |
| 6,847,970 | B2 | * | 1/2005  | Keller et al. ......................... 1/1 |
| 7,409,676 | B2 | * | 8/2008  | Agarwal et al. ............... 717/120 |
| 7,434,202 | B2 | * | 10/2008 | Kramer .......................... 717/120 |
| 7,865,874 | B2 | * | 1/2011  | Wookey ......................... 717/120 |
| 7,937,753 | B2 | * | 5/2011  | Hodges et al. .................. 726/12 |
| 2002/0087734 | A1 | * | 7/2002  | Marshall et al. .............. 709/310 |

(Continued)

FOREIGN PATENT DOCUMENTS

WO        9857260        12/1998
WO    2006033932 A2      3/2006

OTHER PUBLICATIONS

Al-Naeem, T., Dabous, F., Rabhi, F., & Benatallah, B., "Formulating the Architectural Design of Enterprise Applications as a Search Problem." Software Engineering Conference, 2005. Proceedings. 2005 Australian, pp. 282-291.

(Continued)

*Primary Examiner* — Qing Chen
(74) *Attorney, Agent, or Firm* — Lee Law, PLLC; Christopher B. Lee

(57) ABSTRACT

An improved solution for resolving interdependencies between heterogeneous artifacts in software systems is provided. In an embodiment of the invention, a method for finding dependencies in a software system is provided, wherein the method includes: obtaining an input resource, wherein the resource includes a plurality of entry points to the software system and at least one strategy; identifying at least one artifact for each of the plurality of entry points; using the at least one strategy for gathering a plurality of related artifacts in the software system, wherein each of the plurality of related artifacts is heterogeneous in at least one of structure, composition, and relationships; determining a dependency between the gathered plurality of related artifacts; and outputting an output resource, wherein the output resource comprises the at least one dependency.

20 Claims, 9 Drawing Sheets

(56) References Cited

U.S. PATENT DOCUMENTS

| | | | |
|---|---|---|---|
| 2002/0174268 A1 | 11/2002 | Goward et al. | |
| 2004/0015946 A1* | 1/2004 | Te'eni et al. | 717/169 |
| 2004/0039728 A1 | 2/2004 | Fenlon et al. | |
| 2004/0168152 A1* | 8/2004 | Kramer | 717/120 |
| 2005/0172306 A1* | 8/2005 | Agarwal et al. | 719/328 |
| 2006/0212843 A1* | 9/2006 | Zaky et al. | 717/106 |
| 2006/0218623 A1* | 9/2006 | Hodges et al. | 726/3 |
| 2007/0294667 A1* | 12/2007 | Caceres et al. | 717/120 |

OTHER PUBLICATIONS

Keller, A., & Kar, G., "Determining Service Dependencies in Distributed Systems." Proceedins of the IEEE International Conference on Communications (ICC) 2001, Jun. 2001.

Teoh, H. & Wortman, D., "Tools for Extracting Software Structure from Compiled Programs." Proceedings of the 20th IEEE International Conference on Software Maintenance (ICSM '04), 2004.

Markovic, D., Hagemeister, J., Raghavendra, C., & Bhansali, S.,"Semi-automatic Generation of Parallelizable Patterns From Source Code Examples." Program Comprehension, 1997. IWPC apos;97. Proceedings., Fifth Iternational Workshop on Volume , Issue , Mar. 28-30, 1997 pp. 50-59.

Tarja Systa, et al., Analyzing Java Software by Combining Metrics and Program Visualization, Proceedings of the Fourth European Software Maintenance and Reengineering 2000, Feb. 2000, pp. 199-208 (numbered as 1-10, plus 1 citation page), IEEE Computer Society, Washington, DC, Published on the World Wide Web at: http://ieeexplore.ieee.org/xpl/freeabs_all.jsp?arnumber=827328.

A. Brown, et al., An active approach to characterizing dynamic dependencies for problem determination in a distributed environment, Proceedings of the 2001 IEEE/IFIP International Symposium on Integrated Network Management, May 14, 2001, pp. 377-390 (plus 1 citation page), IEEE Computer Society, Washington, DC, Published on the World Wide Web at: http://ieeexplore.ieee.org/xpl/freeabs_all.jsp?arnumber=918054.

Yunchun Li, et al., An Active Method to Building Dynamic Dependency Model for Distributed Components, Proceedings of the Second International Conference on Autonomic Computing, Jun. 13, 2005, pp. 337-338 (plus 1 citation page), IEEE Computer Society, Washington, DC, Published on the World Wide Web at: http://ieeexplore.ieee.org/xpl/freeabs_all.jsp?arnumber=1498086.

Mark Grechanik, et al., An Approach to Evolving Database Dependent Systems (Extended Abstract), Proceedings of the International Workshop on Principles of Software Evolution, 2002, pp. 113-116 (plus 1 citation page), Association for Computing Machinery, New York, NY, Published on the World Wide Web at: http://portal.acm.org/citation.cfm?id=512061&dl=ACM&coll=DL&CFID=27890431&CFTOKEN=21207574.

Fabio Kon, et al., Dependence Management in Component-Based Distributed Systems, Journal: IEEE Concurrency, Jan.-Mar. 2000, pp. 26-36 (numbered as 1-11, plus 1 citation page), vol. 8, Issue 1, IEEE Computer Society, Washington, DC, Published on the World Wide Web at: http://ieeexplore.ieee.org/xpl/freeabs_all.jsp?arnumber=824310.

* cited by examiner

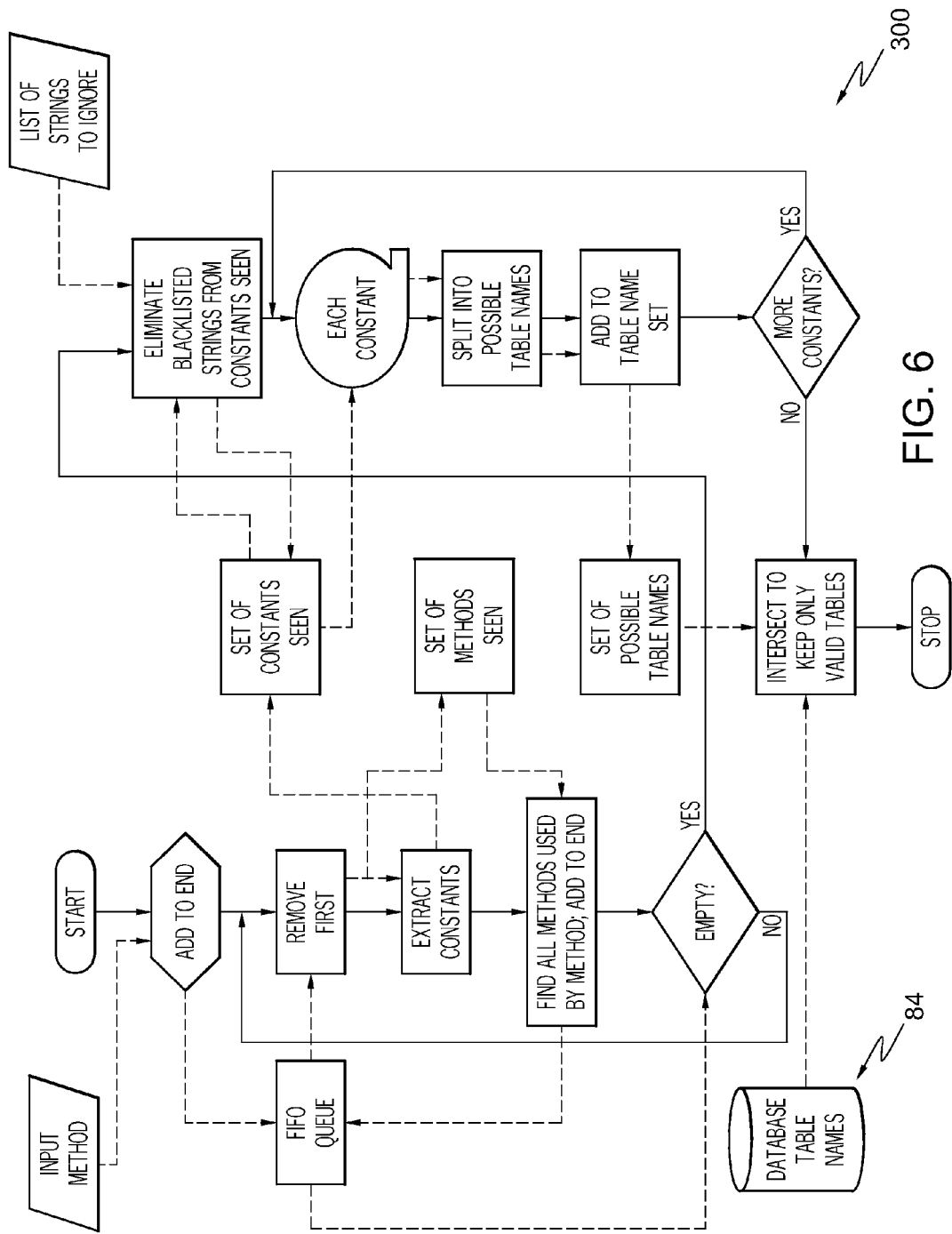

RESOLVING INTERDEPENDENCIES BETWEEN HETEROGENEOUS ARTIFACTS IN A SOFTWARE SYSTEM

FIELD OF THE INVENTION

The present invention generally relates to software systems, and more specifically relates to system and method for resolving interdependencies between heterogeneous artifacts in software systems.

BACKGROUND OF THE INVENTION

Any large software system is constructed from execution and configuration artifacts that are heterogeneous in their type. The types may include, for example, source code artifacts, configuration files, database schemas and instances, web pages (dynamic and static), connectors, message schemas, etc. A challenge in software engineering with this type of system is determining, using static analysis, how the system operates. Code flows often are driven by configurations that span multiple asset types, and, in most cases, they are not even determinable until execution.

As with any system, system configurations change (e.g., modifications to configuration files and/or database configuration tables) over time for a variety of reasons. To make changes, it is often necessary to know details about the structure of the system. To this end, reverse engineering is currently performed to extract the design artifacts from the existing code. However, this type of analysis is, to date, usually focused only on a single artifact type (e.g., source code written in a single programming language). This is problematic because enterprise systems are composed of a multitude of artifact types. Unfortunately, currently analysis of dependencies between artifact types (i.e., heterogeneous types) is done manually. This type of analysis is complex and, as such, is error prone.

In view of the foregoing, a need exists to overcome one or more of the deficiencies in the related art.

SUMMARY OF THE INVENTION

Aspects of the invention provide an improved solution for resolving interdependencies between heterogeneous artifacts in software systems.

A first aspect of the invention provides a method for finding dependencies in a software system, the method comprising: obtaining an input resource, wherein the resource includes a plurality of entry points to the software system and at least one strategy; identifying at least one artifact for each of the plurality of entry points; using the at least one strategy for gathering a plurality of related artifacts in the software system, wherein each of the plurality of related artifacts is heterogeneous in at least one of structure, composition, and relationships; determining a dependency between the gathered plurality of related artifacts; and outputting an output resource, wherein the output resource comprises the at least one dependency.

A second aspect of the invention provides a method for determining dependencies in a software system, the method comprising: obtaining at least one source code artifact; and determining from the at least one source code artifact at least one dependency on a database and a database table.

A third aspect of the invention provides a system for finding dependencies in a software system, the system comprising: a means for obtaining an input resource, wherein the resource includes a plurality of entry points to the software system and at least one strategy; a means for identifying at least one artifact for each of the plurality of entry points; a means for using the at least one strategy for gathering a plurality of related artifacts in the software system, wherein each of the plurality of related artifacts is heterogeneous in at least one of structure, composition, and relationships; a means for determining a dependency between the gathered plurality of related artifacts; and a means for outputting an output resource, wherein the output resource comprises the at least one dependency.

A fourth aspect of the invention provides a computer program comprising program code stored on a computer-readable medium, which when executed, enables a computer system to implement a method for finding dependencies in a software system, the method comprising: obtaining an input resource, wherein the resource includes a plurality of entry points to the software system and at least one strategy; identifying at least one artifact for each of the plurality of entry points; using the at least one strategy for gathering a plurality of related artifacts in the software system, wherein each of the plurality of related artifacts is heterogeneous in at least one of structure, composition, and relationships; determining a dependency between the gathered plurality of related artifacts; and outputting an output resource, wherein the output resource comprises the at least one dependency.

A fifth aspect of the invention provides a method of generating a system for finding dependencies in a software system, the method comprising: providing a computer system operable to: obtain an input resource, wherein the resource includes a plurality of entry points to the software system and at least one strategy; identify at least one artifact for each of the plurality of entry points; use the at least one strategy for gathering a plurality of related artifacts in the software system, wherein each of the plurality of related artifacts is heterogeneous in at least one of structure, composition, and relationships; determine a dependency between the gathered plurality of related artifacts; and output an output resource, wherein the output resource comprises the at least one dependency.

A sixth aspect of the invention provides computer software embodied in at least one propagated signal for finding dependencies in a software system, the at least one propagated signal comprising instructions for causing at least one computer system to: obtain an input resource, wherein the resource includes a plurality of entry points to the software system and at least one strategy; identify at least one artifact for each of the plurality of entry points; use the at least one strategy for gathering a plurality of related artifacts in the software system, wherein each of the plurality of related artifacts is heterogeneous in at least one of structure, composition, and relationships; determine a dependency between the gathered plurality of related artifacts; and output an output resource, wherein the output resource comprises the at least one dependency.

An seventh aspect of the invention provides a business method for finding dependencies in a software system, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which:

FIG. 6 shows a flowchart for employing a database finder strategy according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for resolving interdependencies between heterogeneous artifacts in software systems. In an embodiment of the invention, a method for finding dependencies in a software system is provided, wherein the method includes: obtaining an input resource, wherein the resource includes a plurality of entry points to the software system and at least one strategy; identifying at least one artifact for each of the plurality of entry points; using the at least one strategy for gathering a plurality of related artifacts in the software system, wherein each of the plurality of related artifacts is heterogeneous in at least one of structure, composition, and relationships; determining a dependency between the gathered plurality of related artifacts; and outputting an output resource. As used herein, unless otherwise noted, the term "set" means zero or more; and the phrase "any solution" means any now known or later developed solution.

Figure 1:
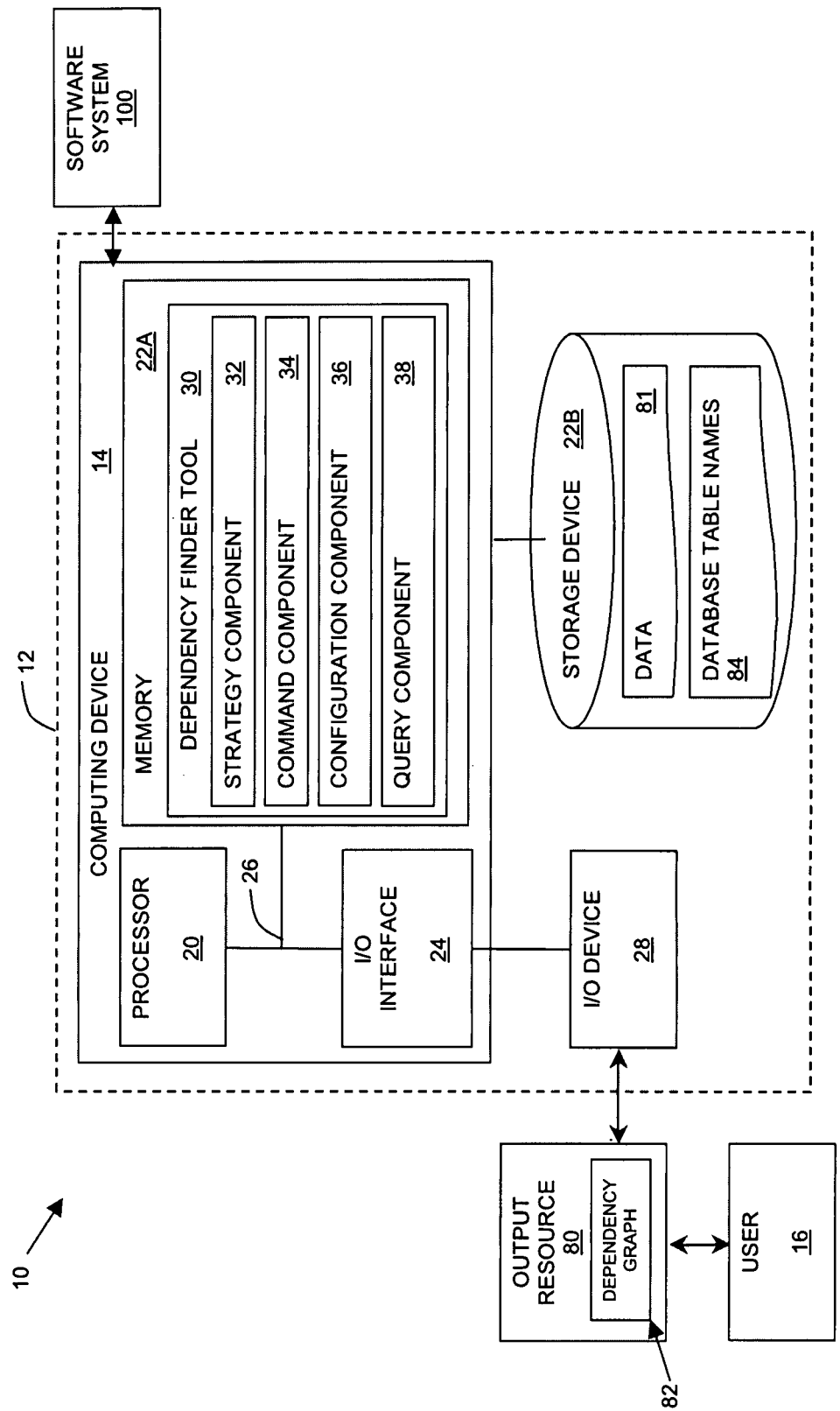
FIG. 1 shows an illustrative environment for employing a method of finding dependencies according to an embodiment of the invention.

Turning to the drawings, FIG. 1 shows an illustrative environment 10 for finding dependencies according to an embodiment of the invention. To this extent, environment 10 includes a computer system 12 that can perform the process described herein in order to find dependencies. In particular, computer system 12 is shown including a computing device 14 that comprises a dependency finder tool 30, which makes computing device 14 operable for finding dependencies in a software system 100 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as dependency finder tool 30, which is stored in a storage system, such as memory 22A and/or storage device 22B. While executing program code, processor 20 can read and/or write data, such as data 81 in software system 100 to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable an element to communicate with computing device 14 using any type of communications link.

In any event, computing device 14 can comprise any general purpose computing article of manufacture capable of executing program code installed thereon. However, it is understood that computing device 14 and dependency finder tool 30 are only representative of various possible equivalent computing devices that may perform the process described herein. To this extent, in other embodiments, the functionality provided by computing device 14 and dependency finder tool 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, dependency finder tool 30 enables computer system 12 to find dependencies in a software system 100. To this extent, dependency finder tool 30 is shown including a strategy component 32, a command component 34, a configuration component 36, and a query component 38. Operation of each of these components is discussed further herein. However, it is understood that some of the various components, or modules, shown in FIG. 1 can be implemented independently, combined, and/or stored in memory of one or more separate computing devices that are included in computer system 12. Further, it is understood that parts of the components and/or functionality may not be implemented, or additional components and/or functionality may be included as part of computer system 12.

Figure 2:
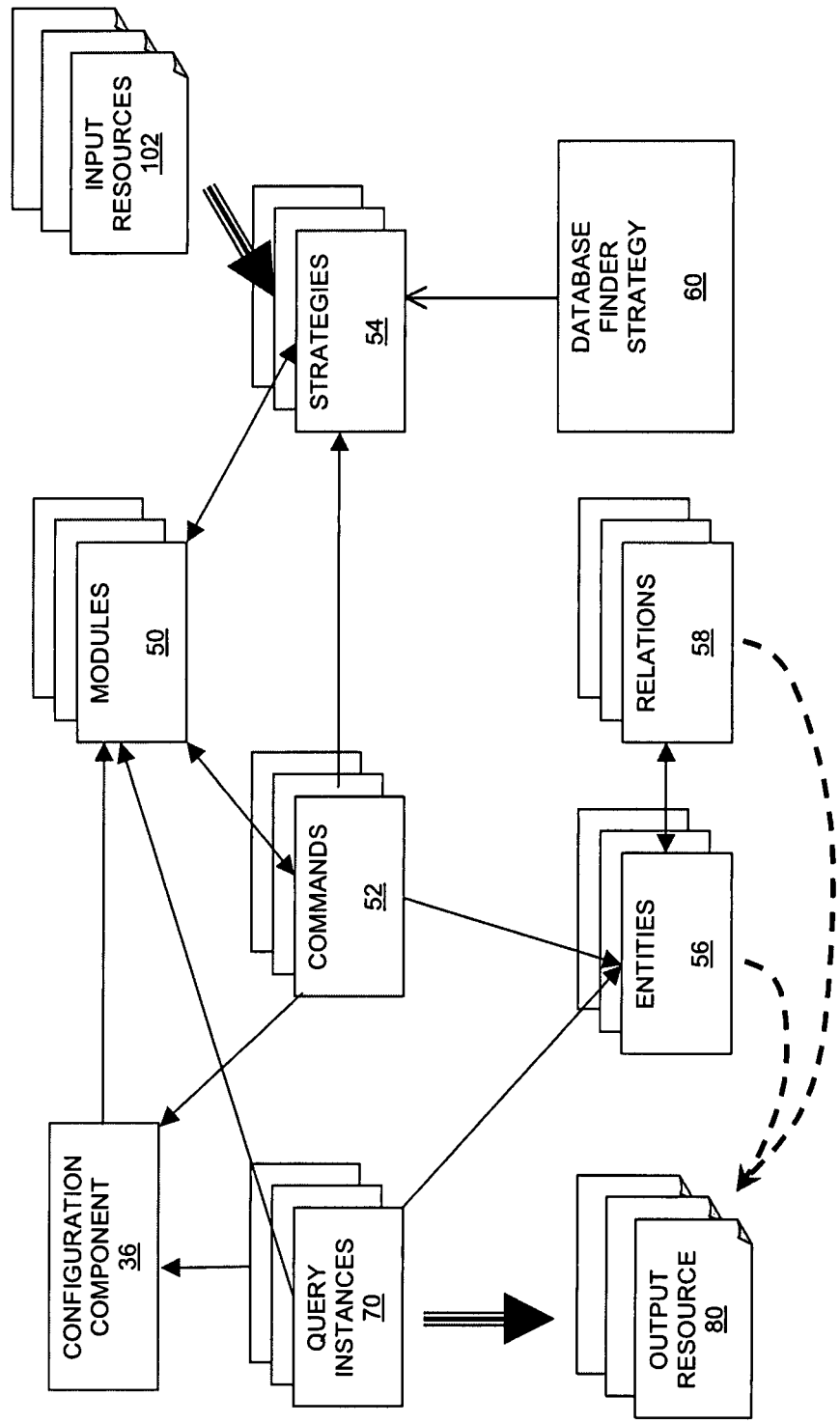
FIG. 2 shows a high level class reference diagram for a dependency finder according to an embodiment of the invention.

Aspects of the invention provide an improved solution for finding dependencies in a software system 100. To this extent, FIGS. 2 through 6 show various embodiments of the use of dependency finder tool 30 (FIG. 1). For example, FIG. 2 depicts a high level class reference diagram of an embodiment of the dependency finder in accordance with an embodiment of the present invention. The diagram shows the high level system of interactions between components in the dependency finder tool 30.

In FIG. 2, boxes indicate classes; thin solid arrows indicate references from one class to another; and, thick solid arrows indicate the general flow of data through the system. Each box in FIG. 2 corresponds to a component in the dependency finder 30. For example, the dependency finder 30 comprises query instances 70 and modules 50. The modules 50 further comprise commands 52, strategies 54, entities 56, and relations 58 (or relationships). A specific strategy 54 comprises a database finder strategy 60. One skilled in the art will recognize that variations of the diagram are possibly including that components such as query instances 70, modules 50, commands 52, strategies 54, entities 56 and relations 58 may comprise a plurality of the referenced components. For example, although three modules 50 are shown, there may be alternatively any quantity of modules 50 (e.g., one or more). Similarly, the other elements shown in FIG. 2 may be of any quantity (e.g., one or more). In any event, the dependency finder 30 may receive input resources 102, from for example software system 100 (FIG. 1) and ultimately provide output resources 80 (e.g., dependency graph 82 at FIG. 1) as products of applying methods herein.

As shown, modules 50 comprise commands 52 and strategies 54. All commands 52 implement a common interface and generate entities 56 and relations 58. Input resources 102 are transformed through strategies 54 and commands 52 into entities 56 and relations 58. Entities 56 have relationships to each other, herein referred to as "Relations" 58. Commands 52, or command instances, can be used exclusively through the common interface without the need to understand what happens internally.

Strategies 54 are assistants to commands 52, extract information from external input resources 102 and make it available as in-memory data. The strategy is closely analogous to the Object-oriented method concept, except that they are implementation nonspecific. The calling command 52 need not know what the strategy 54 does internally and/or what input resources 102 it uses.

Modules 50 comprise a 'container' of commands 52 and strategies 54. All of the strategies 54 make up the strategy component 32, and all of the commands 52 make up the command component 34. Strategies 54 within a module 50 may use other strategies 54 within that module 50, and strategies 54 from any other module 50. Commands 52 within a module 50 may use other commands 52 within that module 50, and commands 52 form any other module 50. Commands 52 may additionally use strategies 54.

Query instances 70 (hereafter alternatively query or queries 70) are the controlling codes for organizing the generation of entities 56, and externalizing those entities 56 into an output resource 80. Queries 70 may be thought of as a controlling method which loads modules 50, chooses strategy 54 implementations and/or input resources 102; executes commands 52; and then writes the desired entities 56 to an output resource 80. The query 70 may be a stand-alone executable, run like any other Java® application. Java® and all Java-based trademarks are trademarks of Sun Microsystems, Inc. in the United States, other countries, or both. Optionally, the query 70 may take arguments from the user 16 (FIG. 1), use a graphical user interface for configuration, load configuration data from a file and/or the like.

In any event, an embodiment of the preset invention comprises a set of data-gathering components; a set of artifact-identification components; and a configuration management component.

The strategy component 32 describes interfaces for strategies 54, and supplies implementations for these strategies 54. The command component 34 describes the types of entities 56 and of their relationships 58 to each other, and commands 52 which describe how to generate instances of those entities 56 and relationships 58 (described in terms of the strategies 54 provided by the strategy component 32). The query component 38 describes the set of queries 70 which may be executed to generate entities 56, and externalize those entities 56 into an output resource 80.

The configuration component 36 may perform the following tasks: determine which entity 56 and relationship 58 types the user is interested in generating interdependencies for; specify any general configuration settings (e.g., search paths, project-wide shared variables, etc.) which are needed by any components of the system; and/or define a description of the toolchain needed and/or desired to produce the desired output. The configuration management component selects which implementation for each data gathering method (e.g., strategy) that is used.

In an embodiment of the present invention, the dependency finder tool 30 may be used as follows. A user constructs and/or imports all data-gathering components. The data-gathering components are registered with a configuration management component. Similarly, the user constructs and/or imports all artifact-identification components. The artifact-identification components similarly may be registered with the configuration management component.

The dependency finder tool 30 is configured (e.g., by a user) with settings comprising: locations of resources from which data is gathered; file(s) in which artifacts and relationships are stored; and/or which artifacts and relationships may be of concern (e.g., critical) to the user. After dependency finder tool 30 configuration, the user may execute the dependency finder 30 which ultimately, as discussed herein, produces the desired output resources 80.

In another more specific embodiment of the present invention, the dependency finder tool 30 may be written in the Java programming language. The data-gathering components comprise: a component which uses Java bytecode files to extract information regarding Java types (e.g., abstractness, qualifiers, method contents and calls, and/or references to other types); a component which analyses XML documents to extract information regarding the elements and attributes stored within and any hierarchical information related to the elements and attributes; and, a component which extracts database table names from SQL creation scripts.

The command component 34 comprises: a component which identifies Enterprise JavaBeans (EJBs) and database tables as artifacts and finds their dependency relationships to each other. This component may use the XML information extraction component discussed herein. The command component 34 may further comprise: a component, using XML information, which identifies Java Access Beans and EJBs as artifacts and finds their dependency relationships to each other. The command component 34 may further comprise a component which identifies certain Java classes as interfaces and implementations in a WebSphere Commerce Command software design pattern construction. The component further identifies Commerce Command Interfaces and Commerce Command Implementations as entities, and identifies two types of relationships between them (i.e., which implementations implement which interfaces, and which interfaces are used by which other implementations). The Commerce Command architecture being analyzed is constructed in such a manner that commands commonly depend on other commands to perform smaller units of work.

Another artifact-identification component may comprise a component which identifies the same command implementations as described above, and the same Access Beans as described above, and, the dependency relationship describing which command implementations depend on which Access Beans.

Figure 3:
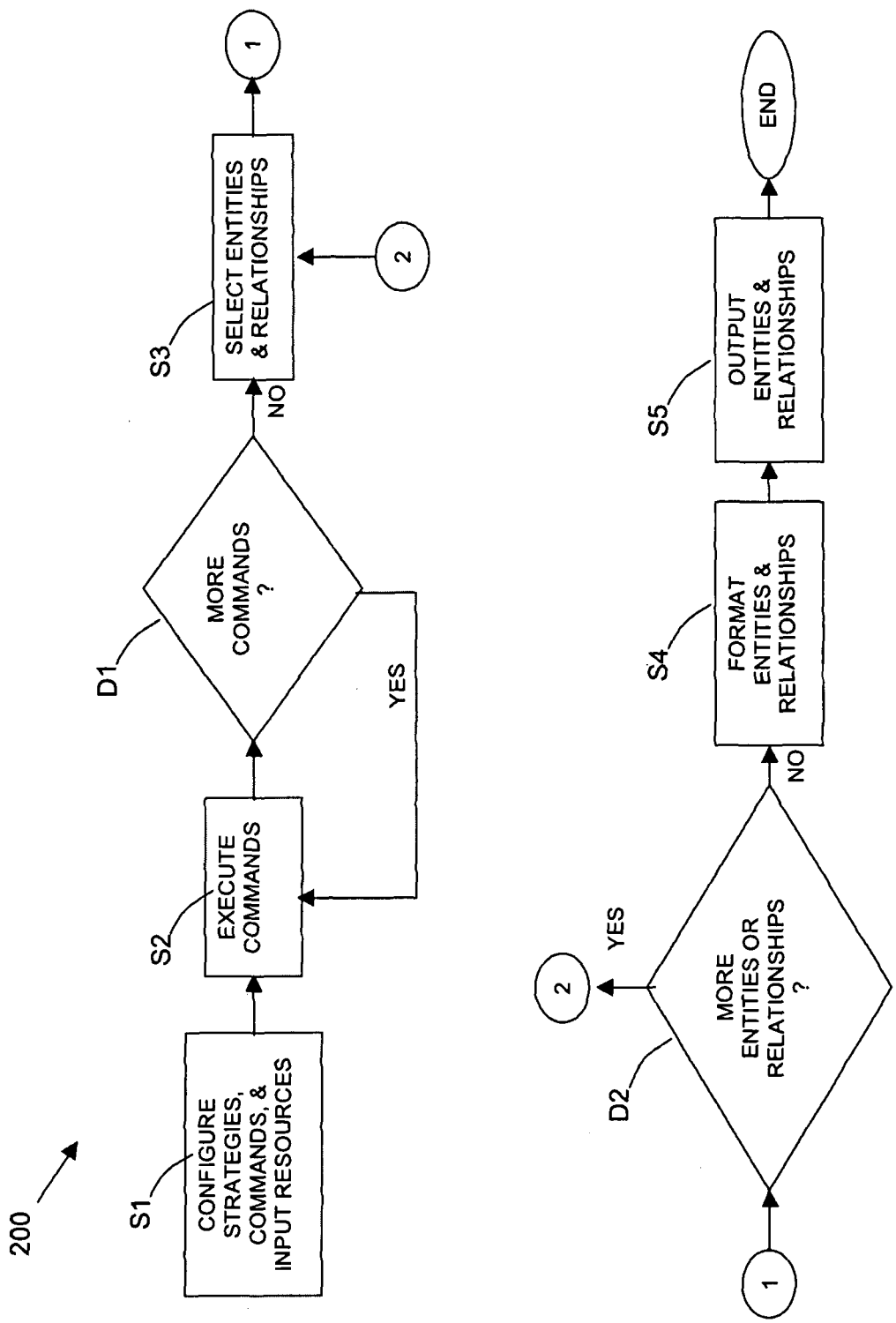
FIG. 3 shows a flowchart depicting generic query development according to an embodiment of the invention.

Turning to FIG. 3, a flowchart 200 showing an embodiment for using query instances 70 (FIG. 2) is depicted. The method 200 includes at S1, configuring strategies, commands, and input resources. At S2, the commands are executed. D1 together with S2 act as a 'loop' by checking for more commands until there are no commands left to execute (i.e., D1 answers "NO"). Then S3 selects entities and relationships. Similarly, D2 together with S3 act as a 'loop' by checking for more entities and relationships until there are no entities and relationships left to select (i.e., D2 answers "NO"). Ultimately, after all commands are executed (i.e., S2) and all entities and relationships are selected (i.e., S3), S4 calls for the formatting of all entities and relationships. The method 200 ends with the outputting, at S5, of the formatted entities and relationships.

Figure 4:
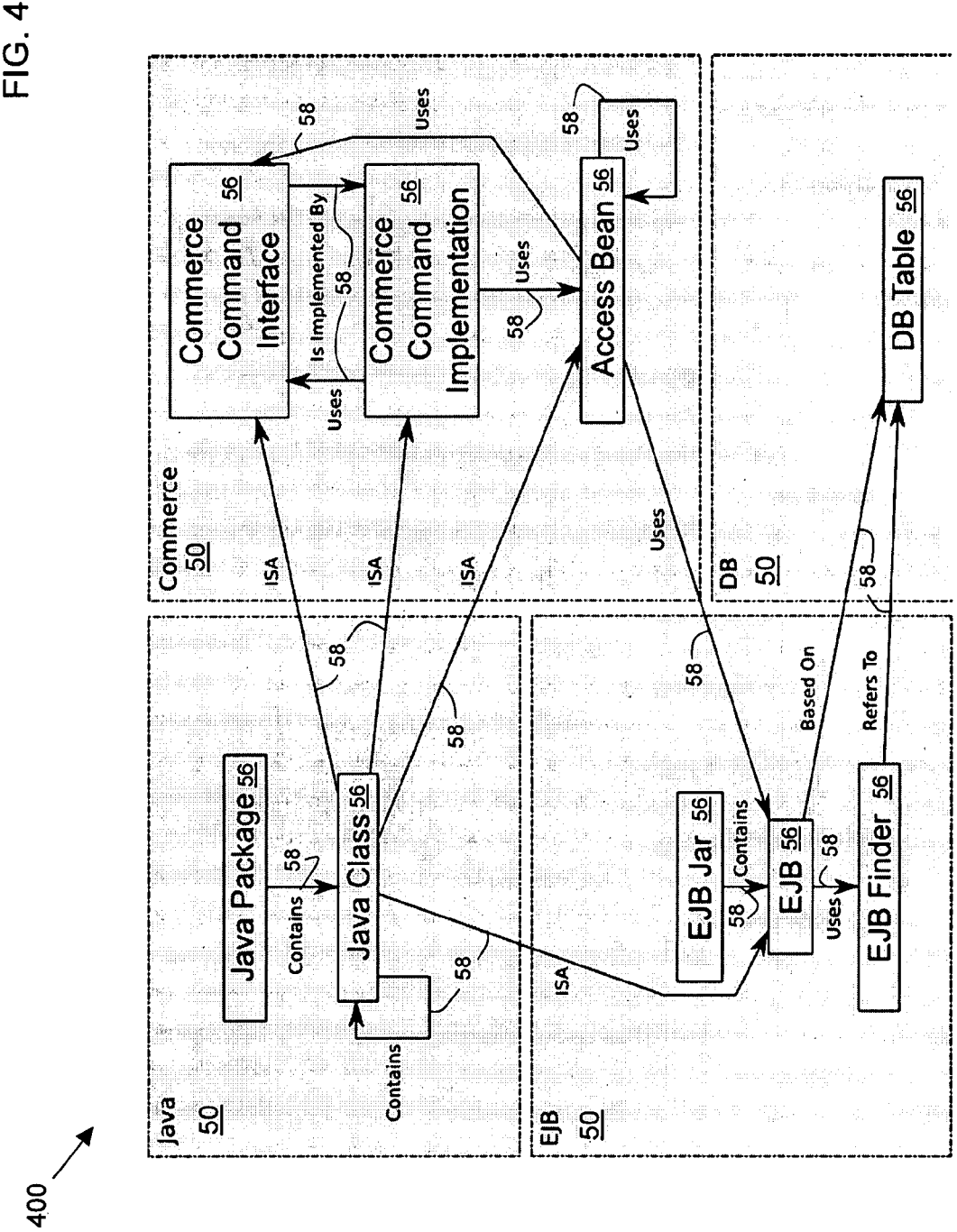
FIG. 4 shows a diagram of the generic output of the dependency finder according to an embodiment of the invention.

FIG. 4 depicts an embodiment of an illustrative scenario 400 according to aspects of the present invention. As shown in FIG. 4, there are several modules 50 depicted including commands 52, entities 56, and relationships 58 thereto as generated under aspects of the present invention. In an embodiment, these modules 50 may be used to perform analysis, for example, of WebSphere Commerce.

The modules 50 include, for example, Java, Commerce, EJB, and DB. The first module, Java 50, may comprise two entities 56, Java Package and Java Class. The entity Java Package 56 represents a container which contains Java classes. The Java specification does not indicate that there is any actual nested relationship between the packages. The Java Package entity 56 may be generated either by direct insertion (e.g., by explicitly creating the entity and giving it to the entity manager) or by discovery (e.g., as a result of finding relationships 58 between an entity 56 and the 'discovered' entity 56) from entities 56 which represent Java classes.

There is another entity 56 representing an element in Java, Java Class. Java classes may be declared within Java packages or within other Java classes, creating a nested containment hierarchy. The Java Class entity 56 can be generated by a variety of means, including direct insertion, by discovery from the Java package or Java class which contains it, by discovery from any of its superclasses or subclasses, or by generalization from a more specific resource type (e.g., Commerce Command Interface 56).

As shown, the relation 58 between the Java Package entity 56 and the Java Class entity 56 is that the subject Java Package entity 56 'Contains' the object Java Class entity 56. It is generated either en masse from the Java package side thereby generating every class that is contained by the given package; or, from the Java class side, thereby generating that class' containing package.

Turning to the DB module 50, an entity 'DB Table' 56 resides therein. The DB Table entity 56 represents a table in a relational database. Any table which follows standard relational database rules may be represented. The entity DB Table 56 is application-independent. The DB Table entity 56 may be generated by batch insertion.

The module EJB 50 comprises entities EJB Jar, EJB, and EJB User Finder 56. The entity EJB 56 represents an Enterprise JavaBean, a lower-level Container Managed Persistence (CMP) object. Access Beans use EJBs to do basic data access, implementing caching and buffering on top of the EJB's basic object view of database entities. An EJB 56 is not identifiable with a specific Java class; an EJB 56 is an abstract concept, whose implementation is comprised of several Java classes (automatically generated) and entries in several XML documents stored within an EJB Jar 56. This entity 56 is generated by discovery from the EJB Jar 56 which it is defined within the context of.

The entity EJB Jar 56 represents an EJB container that further comprises a set of Java packages, Java classes and XML information which collectively define a set of EJBs. All of the various requisite resources for defining a particular EJB are found within EJB Jar 56. In this manner, EJB's are contained within EJB Jar 56. The EJB Jar entity is generated by direct insertion.

The third entity within the module EJB 50 is EJB Finder 56 which comprises an SQL WHERE clause which can be appended to a base SELECT statement, to define what row(s) from the table the EJB represents should be returned in the resulting recordset. This allows a single EJB to have list of predefined database access (e.g., SQL) queries.

Finders fall into two categories: 'simple' finders and 'user' finders. A simple finder comprises a static SQL WHERE clause, which can be appended to the base SELECT statement. The simple finder accepts parameters according to the standard SQL mechanism for parameter substitution. The user finder is typically used when more complex processing is required. The EJB® User Finder 56 comprises a Java® method which takes various parameters as arguments and returns a precompiled SQL statement. The user finder can do arbitrary processing in order to generate the SQL statement, which the simple finder may not. The EJB® User Finder entity 56 is generated by discovery from the EJB® 56 for which it is a finder.

The plurality of entities 56 within the EJB module 50 have a plurality of relations 58, or relationships, with each other and with other entities 56 in other modules 50. For example, the "EJB Jar Contains EJB" relation 58 as indicated in FIG. 4. This indicates that the subject which is an EJB Jar 56 contains 58 the object, which is an EJB 56. It is generated en masse from the EJB Jar side, generating each EJB entity 56 that is defined by resources within a given EJB Jar 56.

Another relationship 58 is indicated by the arrow that the subject, which has type EJB 56, is based on the object, which has type DB table 56. This means that the object explicitly listed within the definition of the subject. In this manner, the EJB has a dependency on that table. It is generated en masse from the EJB side, generating each table that is referenced within the EJB's defining resources.

Another relationship 58 is that EJB 56 uses EJB User Finder 56. The subject, which has type EJB 56, uses the object, which has type EJB User Finder 56. This means that in an application the finder represented by the object can be used to populate an instance of the EJB 56 represented by the subject with data. It is generated en masse from the EJB side 56, generating each finder that is referenced within any of the EJB's defining resources.

Another relationship 58 is that EJB User Finder 56 use DB Table 56. The subject, which has type EJB User Finder 56, uses the object, which has type DB Table 56, to obtain data for an EJB instance. This means that this finder, and by extension the EJB which uses this finder, depend on the database table. It is generated en masse from the EJB User Finder side, generating each DB Table that the finder refers to in strings referenced by its defining method. An algorithm for discovering this relationship may be employed as discussed herein.

Within module Commerce 50, there are a plurality of entities 56 comprising: Commerce Command Interface, Commerce Command Implementation and Access Bean. Commerce Command Interface 56 represents the interface of one instance of the Commerce Command design pattern. Each Commerce Command instance has an interface and at least one implementation, wherein the Commerce Command Interface entity 56 represents that interface. There is exactly one interface for each Commerce Command instance. This entity 56 can be generated by specialization from a Java class node (or from all class nodes within a Java package), or by reference from a Commerce Command Implementation that uses it.

The Commerce Command Implementation entity 56 represents the implementation of one instance of the Commerce Command design pattern. Although each Commerce Command instance can have only one interface, it may have multiple implementations (as per the typical Strategy design pattern), wherein the Commerce Command Implementation 56 represents one of those implementations. This entity 56 can be generated by search from implementations associated with a given Commerce Command Interface, or by specialization from a Java Class entity 56 (or from all classes within a Java package represented by a Java Package entity 56).

The Access Bean entity 56 represents a container in a CMP implementation. An Access Bean 56 is a class which enables reading/writing to a tuple in a database record set. It accelerates the access using caching and block buffering techniques. This entity 56 can be generated by reference from a Commerce Command Implementation 56 or Access Bean entity 56, or by specialization from a Java Class entity (or from all classes within a Java package represented by a Java Package entity).

The relations 58 in Commerce 50 comprise that all three entities in Commerce 50 are Java Class 56. For example, the relations 58 indicate that the subject, which is of type Commerce Command Interface 56, is defined by the object, which is of type Java Class 56. This means that the code which specifies the API for the subject is contained within the object. It is generated either en masse starting from the object (e.g., discovering all Commerce Command Interfaces 56 which are defined by the given class), or singly from the subject (e.g., discovering the Java class which defines the interface).

Another relationship 58 indicates that the object Commerce Command Implementation is an implementation of the subject Commerce Command Interface. It is generated en masse from the interface side, generating every implementation that applies to a given interface.

Another relationship 58 indicates that the subject, which is of type Commerce Command Implementation 56, makes reference to the object, which is of type Commerce Command Interface 56. This means that the object, which uniquely identifies a command instance, is a dependency of the subject. It does not guarantee that the object is used in every possible execution of the subject object, but it may be used in any given execution. It is generated en masse from the subject (e.g., discovering all Commerce Command Interfaces 56 which are referenced by this implementation).

Another relationship 58 indicates that the subject, which is of type Access Bean 56, makes reference to the object, which is of type Access Bean 56. This means that the object is a dependency of the subject. It does not guarantee that the object is used in every possible execution of the subject, only that is may be used in any given execution. It is generated en masse from the subject (e.g., discovering all EJBs 56 which are referred to by the subject access bean 56).

Another relationship 58 indicates that the subject, which is of type Access Bean 56, makes reference to the object, which is of type EJB 56. This means that the object is a dependency of the subject. It is generated en masse from the subject (e.g., discovering all Access Beans 56 which are referred to by the subject access bean 56).

Figure 5A:
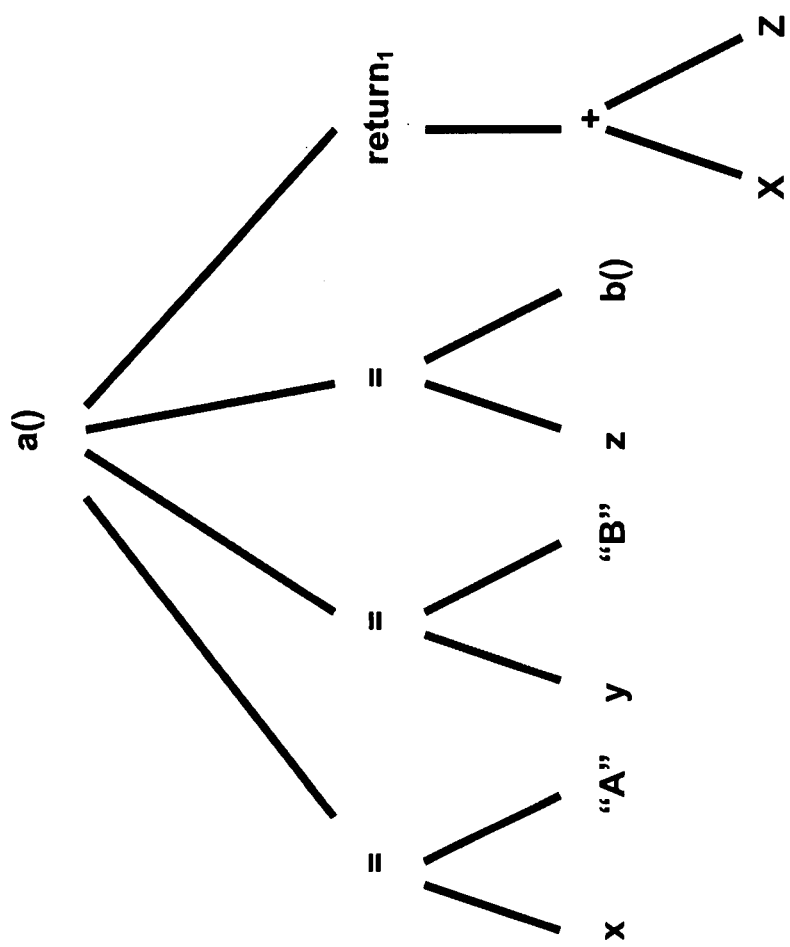
FIGS. 5A-5D show a progression of abstract syntax trees (ASTs) exemplifying the use of a database dependency finder strategy according to an embodiment of the invention.

In another embodiment of the present invention, as shown in FIGS. 5A-5D, an algorithm may operate on code as follows. FIG. 5A depicts a collective view of the state of the system before the database dependency finder algorithm starts. The example described is for "pseudo-code" (i.e., no particular programming language). In any event, the algorithm, wherein "a( )" is the starting point, may be as follows:

```
constant r : string = "R";
sub a( ) : string {
    x,y,z : string;
    x = "A";
```

-continued

```
    y = "B";
    z = b( );
    return x + z;
}
sub b( ) : string {
    return r + "D";
}
```

Given the set of all table names in the database, the method may include building an abstract syntax tree (AST) (see e.g., FIGS. 5A-5D) for the procedure which is the starting point, and ASTs for every procedure which is called from there, until all potentially referenced procedure calls have been resolved. A 'single assignment' transformation is conducted, wherein if a single variable is assigned more than once, every subsequent assignment creates a new variable which is treated completely separately inside the algorithm (not shown in FIGS. 5A-5D).

If any procedure has more than one 'return' actions (e.g., Java allows this), then fuse all of the return actions into a single node which has all of the edges of all of the nodes being fused.

Figure 5B:
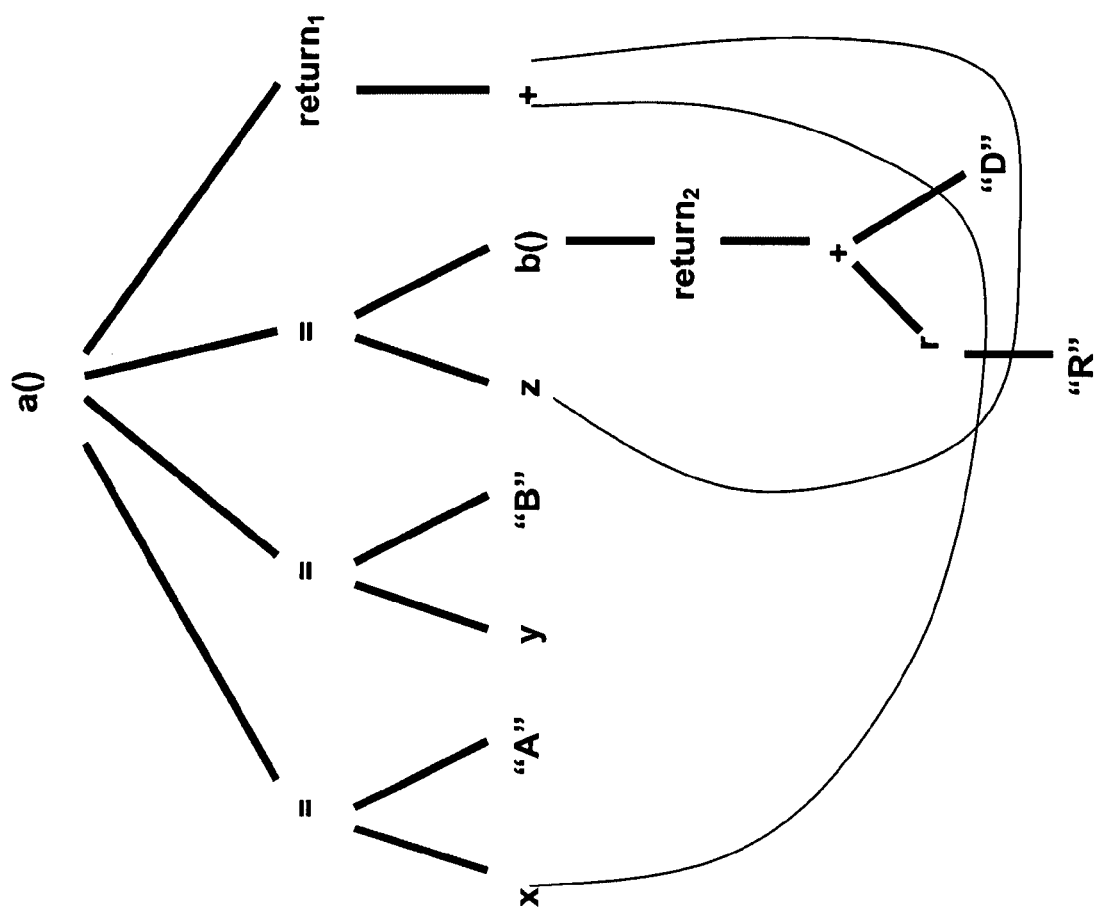

If any procedure calls another, then join the node representing the procedure call in the calling procedure's AST with the node representing the fused 'return' action in the called procedure's AST, as depicted in FIG. 5B. If the same procedure is called from multiple points in the procedure, or from multiple procedures, than all calling procedures are fused to the same instance of the called procedure's AST.

Figure 5C:
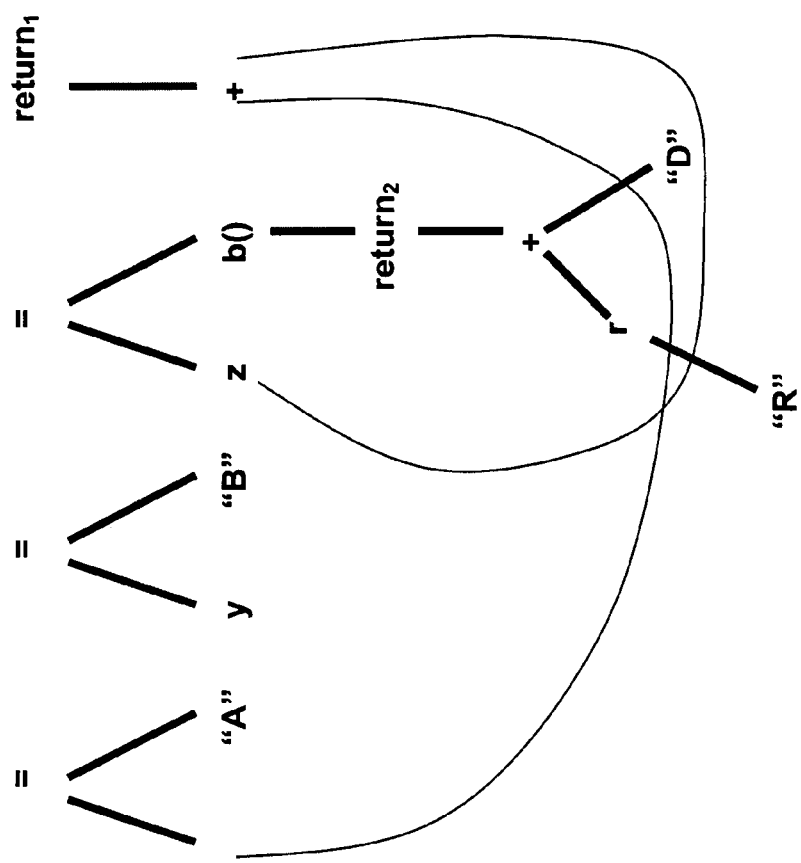
Figure 5D:
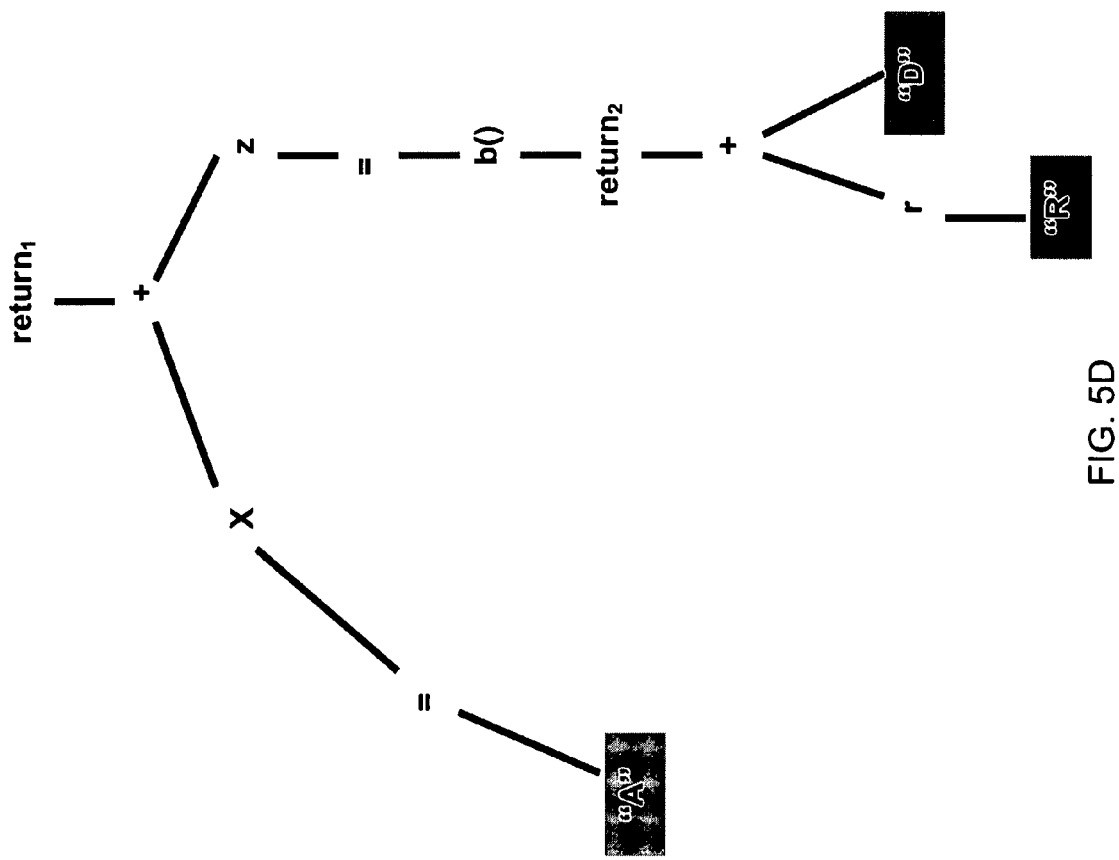

Then fuse all nodes which represent the same variable into a single node. As a result of this step, there typically will be one node per variable, as shown in FIGS. 5C and 5D. While there may result more than one node having the same variable name, each of these similar named nodes will be different in scope, and therefore be a distinct variable.

If a variable is given a string value outside of a procedure (e.g., global static value assignment), add a new node for this string value and link it to the node representing the variable which receives that value.

Remove the root node for each linked procedure's AST. Consider the results of these transformations to be a single general graph.

Take as the root of this graph the fused 'return' action for the procedure given as the starting point. The (sub) graph reachable from the root will represent all parts of the source code which are relevant to the desired output (e.g., all operations, variables, and/or constants which may impact the value returned from that procedure).

Build a set of all string constants reachable from the root. This produces the set of all statically determinable SQL fragments which are relevant to the output. (In the example given, the strings being analyzed are not, in fact, SQL string fragments, but the procedure works without alteration in any case).

For each string in this set, remove it and parse it into a set of identifiers, according to the syntactic constructs in the SQL query language variant used. Join all of these identifier sets into one large set of string identifiers, as shown in FIG. 5D. The set will now contain candidate table names.

Build a set of all table names from the database catalog. Perform the set intersections of these two sets; the resultant set will be the names of all tables which are potentially depended on by the starting point procedure.

In another embodiment of the present invention an algorithm may operate on code as follows. In this embodiment, the source code language is Java® and the database queries are expressed in SQL (the DB2® variant). Further, in this embodiment, the application being analyzed is written using the Java® 2 Platform, Enterprise Edition J2EE®) specification, with Enterprise JavaBeans® (EJB®) as the database abstraction layer. The database catalog is extracted directly from the database creation scripts. This implementation of the algorithm is also written in Java®, as a component of a larger tool.

EJBs may use SQL statements to store and retrieve data from the database, and a 'finder' construct to supply the WHERE clauses in these SQL statements. WHERE clauses may be supplied in a simple, static manner (a single string, essentially: this corresponds to an EJB simple Finder, described herein); but in more complex cases, a call is made to a Java method to return a compiled SQL query object (corresponding to an EJB User Finder). This method may perform arbitrary computation to construct this query object.

Starting from a Java source code asset, the algorithm detects within the source asset references to service methods provided by an object-relational mapping layer, in this case EJBs. The algorithm traverses the references, and from the resolved target source code extracts the corresponding SQL statement. Based on the SQL statement, the referenced database table and field can be determined. For example a goal may be to find all dependent tables from a specific Java class called MyClient. As such, an embodiment of the present invention includes Step 1—Detect references to service methods: Inside the MyClient class, there is a reference to the findCustomerByID( ) method of the Customer class which belongs to the object-relational mapping layer (O/R layer), in this case an EJB. Therefore MyClient has a dependency on Customer.findCustomerByID( ). Further, a Step 2 would include—Extract the corresponding SQL statement: Traverse the dependency identified in Step 1 and look at the configuration file for this source asset, Customer, in the O/R layer and determine that this method invokes the SQL: SELECT*FROM CUSTOMER WHERE CUSTOMER_ID=? The configuration of the O/R object also determines the database that is being referenced (e.g., MYDB). Output: Given this specific SQL query, it can be determined that table 'CUSTOMER' is being referenced. Therefore, MyClient has a dependency on the 'CUSTOMER' table of the 'MYDB' database.

In applying this algorithm, the Java method being called becomes the starting point of the algorithm. A third-party utility makes available ASTs for all Java methods, for all classes within the class path; the AST for the starting point is searched to determine which ASTs are needed, and the rest are ignored. The needed ASTs are stored in memory using an adjacency list representation. As a result, the necessary operations, including a relatively large number of node fusions, are made more efficient.

Node creation, fusion, and/or re-linking described herein are standard graph operations. The AST comes with the requisite information to determine which nodes represent 'return' operations, distinct variables, string constants, method calls, and/or method roots.

Finding all string constants reachable from the root, in the algorithm, may be an application of a standard graph search technique. Java's included java.lang.TreeSet implementation may be used to store the result set. The result set may be represented as java.lang.String objects instead of nodes, because the graph is irrelevant after this point.

Each string in the set is split into separate 'words', where the boundaries between words are defined as any character which is not a valid part of an SQL/DB2 table name identifier. When the set of all these terms is built, many of them may not be valid table names. This has the potential to introduce errors into the analysis. However, these errors will strictly introduce possibly erroneous additional dependencies, and never omit and/or overlook correct dependencies. The method, thereby represents a 'safe' estimate of the interdependency network, and gives a reasonably coherent set of table and field names.

The set of table names from the catalog is stored as a java.util.TreeSet. The intersection of two tree-based sets is performed. After the intersection is calculated, the algorithm is completed. The resulting set will contain java.lang.String objects representing all tables which that finder introduces as potential dependencies. Because it is a set, no duplicate table names will be present.

A set, representing the table dependencies introduced by the finder, thereby results from the execution of the algorithm on one EJB User Finder. In order to obtain table dependencies for the EJB, as a whole, the algorithm may be executed once for each EJB User Finder. The output from each of the 'runs' can be united into a single step, which contains table dependencies for the EJB.

Database Views and virtual tables, under this embodiment, are considered to be nonexistent because these constructs are not present in the SQL create scripts. If table names are generated from the live database catalog, then virtual tables and views would be visible, and a post-processor could additionally be implemented which would separate the dependency set further into its constituent table types.

As shown in FIG. 6, a flowchart showing another embodiment of a method for employing a database finder dependency strategy 60 (FIG. 2). Ultimately, the method 300 may find the names of all database table names 84 from a string of Java code that is input at, for example, S1 (FIG. 3). In other words, this method may find all the databases that the referenced, or inputted, code makes reference to. In this manner, database table references are effectively found in a group of code.

For example, by employing the method depicted in the flowchart in FIG. 6 one is able to determine dependencies in a software system where the software system includes source code artifact(s) and a database(s), wherein the database(s) further have database table(s). The method includes obtaining the source code artifacts from the software system and then determining for the source code artifacts the dependencies on the database table(s). In an embodiment the method further includes resolving the dependency(ies) by detecting references from the source code artifact(s) to at least one object-relational mapping layer asset, wherein the object-relational mapping layer asset(s) is/are bound to the database(s) and the database table(s) based on a configuration file. In another embodiment the method also includes resolving the dependency(ies) by detecting references from the source code artifact(s) to the object-relational mapping layer asset(s); and then traversing the references, thereby extracting any corresponding database queries. Then parsing the these corresponding database queries, thereby resolving a list of the database(s) and the database table(s) referenced. FIG. 6 depicts the source code artifacts as "Input method" and the references to the object-relational mapping layer being traversed are depicted by "Find all methods used by method; add to end". Similarly, the corresponding database queries are extracted at "Extract Constants" in FIG. 6, and the referenced database table is determined at "Intersect to keep only valid tables".

More specifically, starting from some source code asset, the method then detects within that source code asset any references to service methods provided by the object-relational mapping layer. The references are traversed, and from the resolved target source code the corresponding database query(ies) are extracted. Based on the database query(ies) the referenced database table and field is determined.

Another illustrative example may comprise an attempt under aspects of the present invention to look for all dependent tables from a specific Java class (e.g., MyClient). Thus, inside the MyClient class, there is a reference to the findCustomerByID( ) method of the 'Customer' class within the object relational (O/R) mapping layer (e.g., Enterprise Java Bean). From this, it is determined that there is a dependency from MyClient to Customer.findCustomerByID( ). The dependency is traversed, thereby allowing a look at the configuration file for this source asset in the O/R layer and determine that this method invokes the SQL: SELECT*FROM CUSTOMER WHERE CUSTOMER_ID=? Given the configuration of the O/R object, the database that is being referenced is determined (e.g., MYDB). Given this specific SQL query, it is determined that table 'CUSTOMER' is being referenced. As a result, ultimately it is determined, for example, that MyClient has a dependency on the 'CUSTOMER' table of the 'MYDB' database.

In another embodiment, the invention provides a computer program stored on a computer-readable medium, which when executed, enables a computer system to find dependencies. To this extent, the computer-readable medium includes program code, such as dependency finder tool 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for finding dependencies. In this case, a computer system, such as computer system 12 (FIG. 1), can be obtained (e.g., created, maintained, be made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that finds dependencies, which enables users to perform the process described herein on a subscription, advertising, and/or fee basis. That is, a service provider could offer to manage a network and/or a computer system 12 (FIG. 1) that allows users to find dependencies as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; (c) decompression; and/or (d) transformation including, for example, decryption. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for finding dependencies in a software system, the method comprising:
    obtaining an input source code resource comprising source code, where the input source code resource comprises a plurality of source code software system entry points within the source code to the software system;
    obtaining at least one software artifact data gathering strategy configured to extract information from the input source code resource;
    identifying a plurality of artifacts in the software system comprising at least one artifact for each of the plurality of source code software system entry points;
    using the obtained at least one software artifact data gathering strategy to gather a plurality of related artifacts in the software system from the identified plurality of artifacts, where each of the plurality of related artifacts is heterogeneous in at least one of structure, composition, and relationships;
    determining at least one dependency between the gathered plurality of related artifacts; and
    outputting an output resource, where the output resource comprises the determined at least one dependency between the gathered plurality of related artifacts gathered using the obtained at least one software artifact data gathering strategy.

2. The method of claim 1, where the output resource comprises a dependency graph enumerating dependencies between various heterogeneous related artifacts gathered from the software system.

3. The method of claim 1, where using the obtained at least one software artifact data gathering strategy to gather the plurality of related artifacts in the software system from the identified plurality of artifacts comprises:
    extracting software system execution information from at least one of a plurality of source code artifacts and a plurality of binary code artifacts;
    extracting a software system configuration and execution structure from a plurality of structured documents; and
    extracting database topology from a plurality of database creation and administration scripts.

4. The method of claim 1, where identifying the plurality of artifacts in the software system comprising the at least one artifact for each of the plurality of source code software system entry points comprises:
- identifying container managed persistence (CMP) objects and database tables as artifacts; and
- finding dependencies between the CMP objects and the database tables.

5. The method of claim 1, where using the obtained at least one software artifact data gathering strategy to gather the plurality of related artifacts in the software system from the identified plurality of artifacts comprises:
- identifying instances of a specific type of source code artifact or binary code artifact based on object inheritance; and
- identifying all possible substitutions for a given artifact type in the software system based on one of a static configuration and a dynamic configuration.

6. The method of claim 1, where identifying the plurality of artifacts in the software system comprising the at least one artifact for each of the plurality of source code software system entry points comprises:
- identifying instances of a specific type of source code artifact or binary code artifact based on object inheritance; and
- identifying relationships between objects of the identified instances of the specific type of source code artifact or binary code artifact while allowing other dependencies to be ignored.

7. The method of claim 1, further comprising resolving a dependency between a database access query dynamically constructed in a source code artifact or a binary code artifact and a database table and field on which the database access query depends.

8. A method for determining dependencies in a software system, the software system comprising at least one source code artifact and at least one database comprising at least one database table, the method comprising:
- obtaining an input source code resource comprising source code, where the input source code resource comprises a plurality of source code software system entry points within the source code to the software system;
- obtaining at least one software artifact data gathering strategy configured to extract information from the input source code resource;
- using the obtained at least one software artifact data gathering strategy to gather the at least one source code artifact from the software system;
- determining, by a processor using source code of the at least one source code artifact, at least one dependency reference within the source code of the at least one source code artifact to the at least one database table; and
- outputting an output resource, where the output resource comprises the determined at least one dependency reference within the source code of the at least one source code artifact to the at least one database table gathered using the obtained at least one software artifact data gathering strategy.

9. The method of claim 8, further comprising resolving the at least one dependency reference within the source code of the at least one source code artifact to the at least one database table by detecting a plurality of references from the at least one source code artifact to at least one object-relational mapping layer asset, where the at least one object-relational mapping layer asset is bound to the at least one database and the at least one database table based on a configuration file.

10. The method of claim 8, further comprising:
- resolving the at least one dependency reference within the source code of the at least one source code artifact to the at least one database table by detecting a plurality of references from the source code of the at least one source code artifact to at least one object-relational mapping layer asset;
- traversing the plurality of references and extracting a plurality of corresponding database queries; and
- parsing the plurality of corresponding database queries and resolving a list of the at least one database and the at least one database table referenced by at least one of the plurality of corresponding database queries.

11. The method of claim 8, further comprising:
- resolving the dependencies by detecting database calls referenced within the source code of the at least one source code artifact; and
- statically constructing a set of possible structured query language (SQL) statements based on one of control flow and a portion of SQL text detectable in the source code of the at least one source code artifact.

12. A system for finding dependencies in a software system, the system comprising:
- an input/output (I/O) interface; and
- a processor programmed to:
  - obtain an input source code resource comprising source code, where the input source code resource comprises a plurality of source code software system entry points within the source code to the software system;
  - obtain at least one software artifact data gathering strategy configured to extract information from the input source code resource;
  - identify a plurality of artifacts in the software system comprising at least one artifact for each of the plurality of source code software system entry points;
  - use the obtained at least one software artifact data gathering strategy to gather a plurality of related artifacts in the software system from the identified plurality of artifacts, where each of the plurality of related artifacts is heterogeneous in at least one of structure, composition, and relationships;
  - determine at least one dependency between the gathered plurality of related artifacts; and
  - output, via the I/O interface, an output resource, where the output resource comprises the determined at least one dependency between the gathered plurality of related artifacts gathered using the obtained at least one software artifact data gathering strategy.

13. The system of claim 12, where the output resource comprises a dependency graph enumerating dependencies between various heterogeneous related artifacts gathered from the software system.

14. The system of claim 12, where, in being programmed to use the obtained at least one software artifact data gathering strategy to gather the plurality of related artifacts in the software system from the identified plurality of artifacts, the processor is programmed to:
- extract software system execution information from at least one of a plurality of source code artifacts and a plurality of binary code artifacts;
- extract a software system configuration and execution structure from a plurality of structured documents; and
- extract database topology from a plurality of database creation and administration scripts.

15. The system of claim 12, where, in being programmed to identify the plurality of artifacts in the software system comprising the at least one artifact for each of the plurality of source code software system entry points, the processor is programmed to:
 identify container managed persistence (CMP) objects and database tables as artifacts; and
 find dependencies between the CMP objects and the database tables.

16. The system of claim 12, where, in being programmed to use the obtained at least one software artifact data gathering strategy to gather the plurality of related artifacts in the software system from the identified plurality of artifacts, the processor is programmed to:
 identify instances of a specific type of source code artifact or binary code artifact based on object inheritance; and
 identify all possible substitutions for a given artifact type in the software system based on one of a static configuration and a dynamic configuration.

17. The system of claim 12, where, in being programmed to identify the plurality of artifacts in the software system comprising the at least one artifact for each of the plurality of source code software system entry points, the processor is programmed to:
 identify instances of a specific type of source code artifact or binary code artifact based on object inheritance; and
 identify relationships between objects of the identified instances of the specific type of source code artifact or binary code artifact while allowing other dependencies to be ignored.

18. The system of claim 12, where the processor is further programmed to resolve a dependency between a database access query dynamically constructed in a source code artifact or a binary code artifact and a database table and field on which the database access query depends.

19. A computer program comprising program code stored on a non-transitory computer-readable storage medium, which when executed, enables a computer system to implement a method for finding dependencies in a software system, the method comprising:
 obtaining an input source code resource comprising source code, where the input source code resource comprises a plurality of source code software system entry points within the source code to the software system;
 obtaining at least one software artifact data gathering strategy configured to extract information from the input source code resource;
 identifying a plurality of artifacts in the software system comprising at least one artifact for each of the plurality of source code software system entry points;
 using the obtained at least one software artifact data gathering strategy to gather a plurality of related artifacts in the software system from the identified plurality of artifacts, where each of the plurality of related artifacts is heterogeneous in at least one of structure, composition, and relationships;
 determining at least one dependency between the gathered plurality of related artifacts; and
 outputting an output resource, where the output resource comprises the determined at least one dependency between the gathered plurality of related artifacts gathered using the obtained at least one software artifact data gathering strategy.

20. A method of generating a system for finding dependencies in a software system, the method comprising:
 providing a computer system operable to:
  obtain an input source code resource comprising source code, where the input source code resource comprises a plurality of source code software system entry points within the source code to the software system;
  obtain at least one software artifact data gathering strategy configured to extract information from the input source code resource;
  identify a plurality of artifacts in the software system comprising at least one artifact for each of the plurality of source code software system entry points;
  use the obtained at least one software artifact data gathering strategy to gather a plurality of related artifacts in the software system from the identified plurality of artifacts, where each of the plurality of related artifacts is heterogeneous in at least one of structure, composition, and relationships;
  determine at least one dependency between the gathered plurality of related artifacts; and
  output an output resource, where the output resource comprises the determined at least one dependency between the gathered plurality of related artifacts gathered using the obtained at least one software artifact data gathering strategy.

* * * * *